Figure 1:
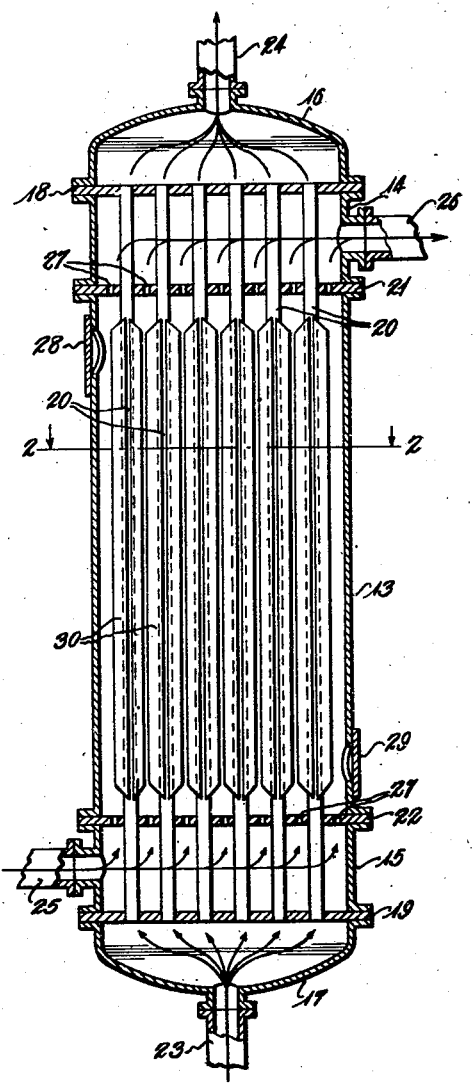

Sept. 14, 1943.   T. P. SIMPSON ET AL   2,329,658
METHOD OF CONVERTING PETROLEUM AND LIKE OILS
Original Filed Sept. 1, 1937   4 Sheets-Sheet 1

Inventors
Thomas P. Simpson,
John W. Payne,
John A. Crowley, Jr.
& Clark S. Teitsworth By Dallas R. Lamont Attorneys Sept. 14, 1943. T. P. SIMPSON ET AL 2,329,658
METHOD OF CONVERTING PETROLEUM AND LIKE OILS
Original Filed Sept. 1, 1937 4 Sheets-Sheet 2

Inventors
Thomas P. Simpson,
John W. Payne,
John A. Crowley, Jr.
& Clark S. Teitsworth By Dallas R. Lamont Attorney Sept. 14, 1943.   T. P. SIMPSON ET AL   2,329,658
METHOD OF CONVERTING PETROLEUM AND LIKE OILS
Original Filed Sept. 1, 1937   4 Sheets-Sheet 3

Inventors
Thomas P. Simpson,
John W. Payne,
John A. Crowley, Jr.
and Clark S. Teitsworth Dallas R. Lamont   Attorneys Sept. 14, 1943.　　T. P. SIMPSON ET AL　　2,329,658
METHOD OF CONVERTING PETROLEUM AND LIKE OILS
Original Filed Sept. 1, 1937　　4 Sheets-Sheet 4

Inventors
Thomas P. Simpson,
John W. Payne,
John A. Crowley, Jr.
Clark S. Teitsworth
By
Dallas R. Lamont　Attorneys Patented Sept. 14, 1943

2,329,658

UNITED STATES PATENT OFFICE 2,329,658

METHOD OF CONVERTING PETROLEUM AND LIKE OILS

Thomas P. Simpson, John W. Payne, and John A. Crowley, Jr., Woodbury, and Clark S. Teitsworth, Plainfield, N. J., assignors to Socony-Vacuum Oil Company, Incorporated, New York, N. Y., a corporation of New York Original application September 1, 1937, Serial No. 162,070. Divided and this application December 7, 1939, Serial No. 308,058

18 Claims. (Cl. 196—52)

This invention is directed particularly to methods of converting or reacting upon hydrocarbon oils catalytically, and in general relates to reactions concerning petroleum or like oils which reactions are conducted in the presence of a contact mass, including regeneration of the contact mass.

This application is a division of our copending application Serial Number 162,070, filed September 1, 1937, now Patent No. 2,185,930 and is directed to a process of the general type disclosed and claimed in our copending application Serial Number 162,069, filed September 1, 1937, now Patent No. 2,185,929 which invention is directed to catalytic processes in general, and may be carried out in an apparatus such as disclosed and claimed in our copending application Serial Number 162,068 filed September 1, 1937, now Patent No. 2,185,928. The process herein disclosed and claimed was devised to afford a method particularly adapted for carrying out processes of catalytic conversion of hydrocarbon oils and may be carried out in an apparatus such as, for instance, is disclosed in our copending case Serial Number 162,071, filed September 1, 1937, now Patent No. 2,185,931. Our copending applications, Serial Numbers 162,540, now Patent No. 2,209,040, 162,541 and 162,542, now Patent No. 2,222,304, filed September 4, 1937, are likewise directed to processes and apparatus for catalytic conversion of the same general type as that of said Serial Numbers 162,068 and 162,069. However, among other features these three former cases are directed to novel features of reversal of fluid flow, continuous flow of catalytic material and controlling temperature of catalytic material respectively.

Many types of conversions of hydrocarbons into materials of different properties, physical and/or chemical, or carried on by contacting the hydrocarbons, frequently in vapor form and at high temperature, with a contact mass composed of particles which themselves have a catalytic effect, or which are impregnated with or act as a support for material of a catalytic nature appropriate to the result desired. Such operations may contemplate, for example, the conversion of hydrocarbons of high boiling point into hydrocarbons of lower boiling point by catalytic cracking in the vapor phase. Another common operation is the polymerization, under catalytic conditions, of light or gaseous hydrocarbons to form hydrocarbons of higher boiling point. Other operations of this same general nature are catalytic dehydrogenation, desulphurizing, partial oxidation or similar conversions of hydrocarbons under similar conditions. Some operations carried out wholly or partially in liquid phase present similar problems. The method of operation herein disclosed is applicable to such conversions in general. This method is equally applicable to both endothermic and exothermic reactions. Of these operations, the vapor phase cracking of hydrocarbons to produce gasoline is typical, and this specification will hereinafter discuss such operation as exemplary without, however, intending to be limited thereby or thereto except by such limitations as are stated in the claims.

It is known that hydrocarbon oils of high boiling point, when properly contacted in vapor phase with a catalytic material of proper kind are converted into oils of lower boiling point of highly useful nature. Processes based upon this principle have been developed. One type of catalyst which has been used is composed of granular particles of the nature of clay, which may or may not have deposited thereon or therein other materials of a catalytic nature. Mineral oil fractions of the nature of gas oil may, for example, be conducted at temperatures of say 810° F. or higher over a catalytic mass composed of cylindrical particles of catalytic (activated) clay about 2½ mm. diameter by 4 mm. length, resulting in substantial conversion into gasoline. In most prior proposed petroleum catalytic processes, petroleum vapors are merely passed into a body of catalyst of large or small depth and are caused to flow through the catalyst in more or less broadcast manner. In such operations considerable difficulties are had with channeling, short circuiting, and the like, whereby some portions of the catalyst volume are never reached by a proper amount of reaction mixture and others are consistently reached by too much reaction mixture, resulting in erratic and improper treatment. Also, localized reactions cause localized deposits of reaction products, and during regeneration of the catalyst, cause localized regeneration, which is unsatisfactory. It has been proposed to place catalytic material in furnace tubes through which oil is passed but this is not suitable for reactions where thermal cracking is not desired, as well as for other reasons. It has also been proposed to distill oil and then pass vapors from the distillation operation through catalyst containing tubes submerged in the body of oil undergoing distillation. This operation is not useful, having many objections, including limitations of temperature and heat control, lack of independence between conditions outside the tubes and inside the tubes, cumbersomeness of equipment and operation.

It is an object of this invention to provide a method of catalytic vapor phase conversion of hydrocarbons, and in general a method of conducting reactions upon petroleum in the presence of a contact mass, including regeneration of said mass, which is effective in producing the desired results, avoids the various objections stated above, combines high rates of charge with high yields of desirable product, is capable of efficient and uniform use of all portions of the catalyst mass, is capable of effecting rapid, complete, uniform and readily controlled regeneration of catalyst in situ, is economical in operation as well as simple and flexible, and is capable of being housed in equipment of economical design and capable of easy maintenance.

This invention embodies the principle, which we have established, that the hydrocarbon reactions contemplated herein are best carried on in a catalyst path which is of relatively great length in the direction of flow of reaction material and relatively quite thin in at least one direction transverse to the direction of flow of reaction material, if the rate of reaction in the various proportions of that path be properly controlled, and that the necessary control may be accomplished by properly forming the catalyst paths and placing them adjacent paths for a heat exchange medium, establishing the proper relation between such paths and the contents thereof, and continuously and positively circulating a heat transfer medium in proper heat exchange relationship with the catalyst. The reaction method practiced in accordance with this invention leaves the spent catalyst in a condition well fitted for easy and uniform regeneration, and with the regeneration also conducted in accordance with the invention, a unitary conversion process of great utility results therefrom.

Effective control of conditions throughout the catalyst or contact mass is an important element of the invention. This invention provides a method for conducting the reactions referred to herein, including regeneration of contact material in situ, by means of which such effective control of conditions is accomplished, thereby attaining correspondingly effective operation. Proper flow of reactants through the contact mass is effected, so that all portions of the fluid traversing the mass receive substantially identical treatment, thus promoting uniformity of reaction and uniformity of quality in the reaction product. This is accomplished by providing a plurality of long unit paths of flow, having at least one relatively short cross-dimension, through the contact mass, wherein the variation in length of paths travelled by different portions of the fluid flowing through the mass is small. In one embodiment, provision may be made for by-passing virtually any desired section of each unit path so that, in case the path becomes blocked at some point, as for instance by accumulated fines, unburned carbon, or the like, instead of the entire path becoming useless or impaired, the particular point in the path which is blocked is by-passed and substantially full use of the contact mass throughout the remainder of the path is secured. Various embodiments accomplishing this are illustrated in the drawings and described herein.

Effective temperature control throughout the contact mass is accomplished. Heat transfer elements are associated with the respective catalyst paths, and every part of the contact mass lies sufficiently close to a heat transfer element to insure notable uniformity of temperature throughout the entire contact mass. Heat can be put into the contact mass or removed from it as desired. Heat distribution between different portions of the catalyst mass is effected. This means for effecting this transfer of heat and control of temperature preferably involves positive circulation at relatively high velocity of heat transfer medium through the heat transfer elements. A high boiling point liquid having a relatively high unit volume heat absorption capacity per degree temperature change is preferred, although fluid media such as vapors, steam, gas, air, or the like, may be used. Means for heating or cooling the circulating heat transfer medium are provided.

A small volume of heat transfer medium relative to volume of contact mass is used. This conserves size and cost of apparatus, with a high proportion of total apparatus volume occupied by contact mass. It gives flexibility to the operation of the apparatus, because the entire volume of heat transfer medium in the apparatus is renewed at short intervals by the recirculation, with corresponding quick response of the apparatus to the temperature control effected by adding heat to or abstracting heat from the recirculating body of heat transfer medium. This is important in practically all operations and particularly in operations where reactions are conducted in sequence at different temperature levels, where temperature must be built up to initiate a reaction, and the like. A large area of heat transfer surface in contact with the catalyst mass relative to volume of heat transfer medium in the apparatus is used. This is important in making possible the use of a small volume of heat exchange medium with its attendant flexibility of operation just mentioned. These features result in advantages in design, construction and cost of apparatus; e. g., in most forms of commercial apparatus, fewer heat transfer fluid passages are required, wider spacing of these elements is possible, stronger headers are made possible thereby, or thinner but equally strong headers. A high ratio of heat transfer surface to volume of contact mass is used, this being important in effecting adequate temperature control throughout the entire contact mass. When such extra surface is used, this extra surface is utilized also to define the flow paths through the contact mass.

The foregoing novel features are important in practical operation. The optimum and limiting values of the ratios, etc., mentioned above are important to the invention and have now been reasonably well determined and are set forth in detail below. The above-described requirements for best operation have been verified by actual trial and experimentation. Adherence to the novel principles and limits set forth herein results in advantages of extreme importance and, conversely, departure therefrom results in serious disadvantages. For example, in the catalytic cracking of gas oil from petroleum to make gasoline, with regeneration of the catalyst in situ by burning off the deposited carbon, the operation ordinarily can be conducted with two catalyst cases build in accordance with the principles and data given above, one case being in regeneration while the other is on stream. Substantial departure from the principles stated herein, for example departure from the stated ratios, may result in slowing down regeneration and increasing length of cycle to the point where regeneration cannot be effected during the useful on stream time of one catalyst case, thereby requiring three cases instead of two. Furthermore, such departure from the requirements of this invention results in wider temperature variations within the body of the contact mass, less uniformity of reaction and regeneration, and lower yield per unit volume of contact mass and per unit volume of material charged. If it is attempted to force the operation to offset some of these disadvantages, other serious objections are encountered including destruction of the catalyst because of excessively intense burning at localized points.

Figure 2:
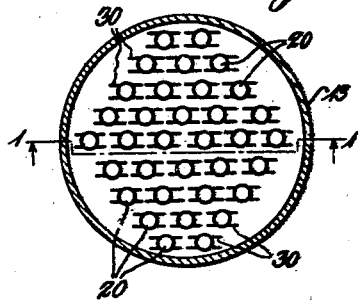
Figure 6:
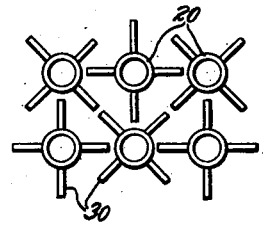
Figure 7:
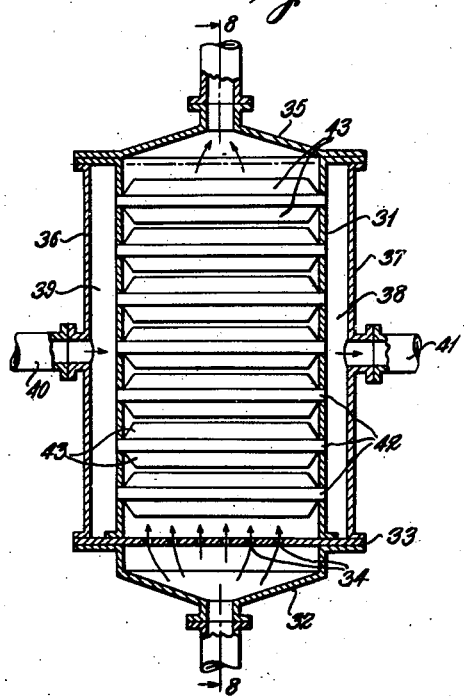
Figure 8:
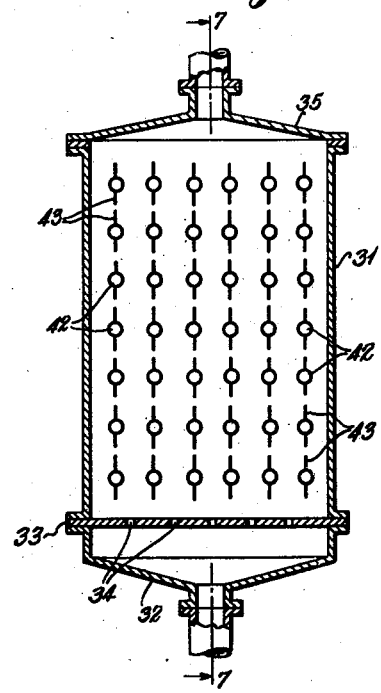
Figure 9:
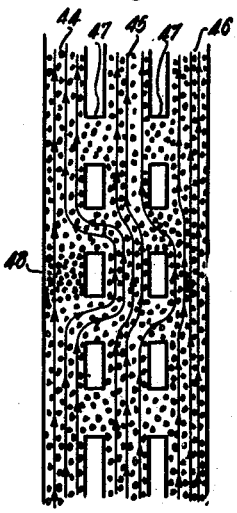
Figures 10, 11:
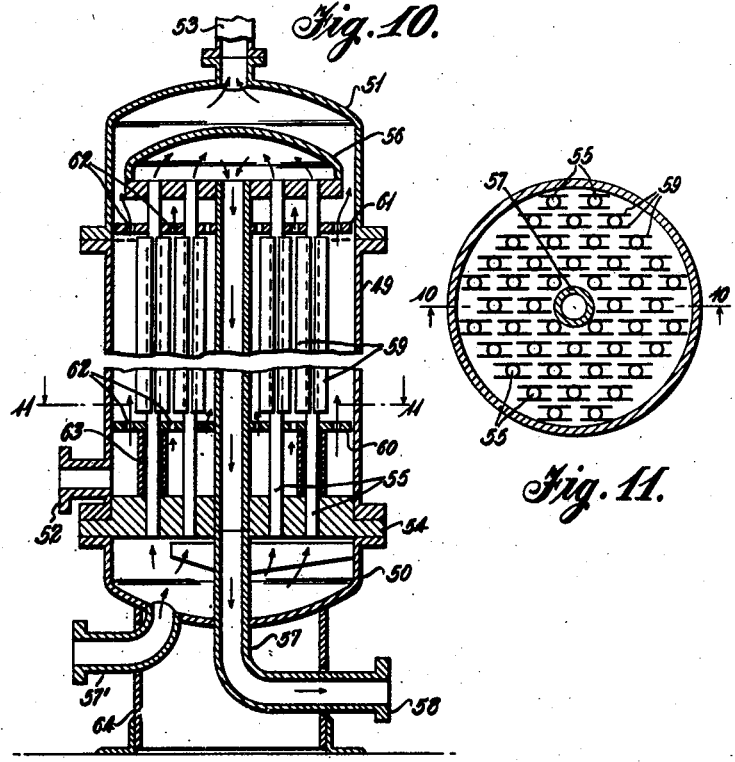
Figure 14:
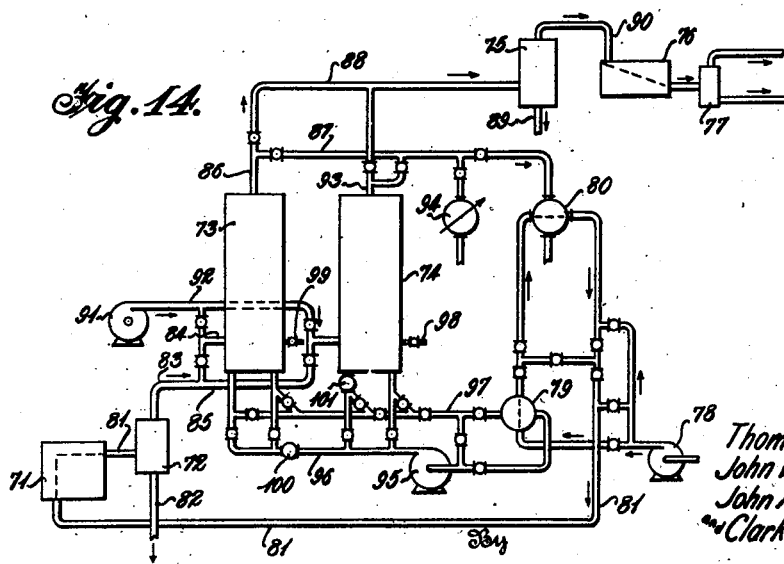
Figure 12:
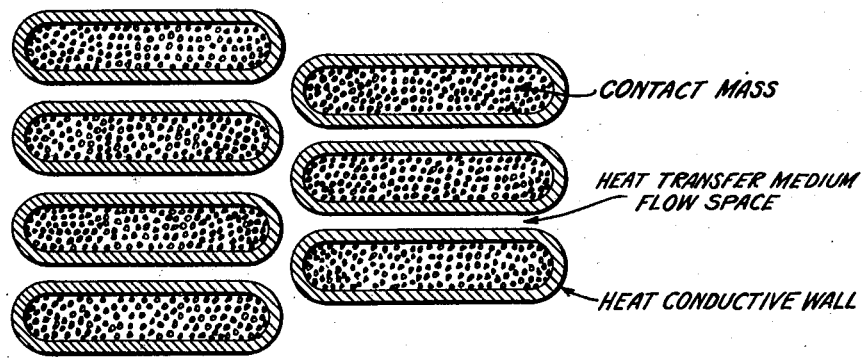
Figure 13:
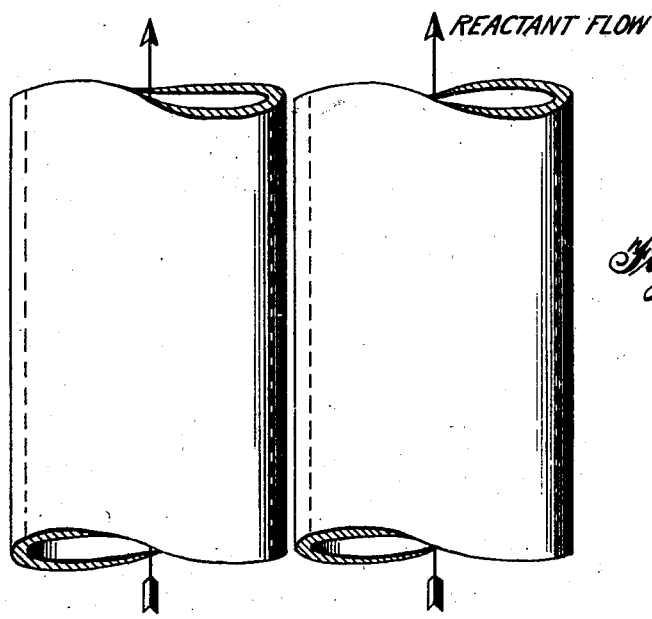

To completely understand the process to be practiced, reference is now made to the drawings attached to this specification. In these drawings, Figure 1 shows a longitudinal sectional view of one form of the apparatus; Figure 2 shows a cross-section of that form, and Figures 3, 4, 5 and 6, set forth certain optional arrangements which may be used therein. Figures 7 and 8 show longitudinal sections in planes 90° apart of another form of apparatus embodying the same general characteristics. Figure 9 is a diagram explaining one feature of the invention. Figure 10 is a sketch showing a longitudinal section of a form of apparatus embodying the same essentials and of greater utility for commercial practice of the invention. Figure 11 is a cross-section of the apparatus shown in Figure 10. Figures 12 and 13 show an alternative general form of apparatus. Figure 14 is an illustration of how the apparatus may be set up and operated for commercial practice of the process to be conducted therein.

Referring now to Figures 1 to 6, inclusive, Figure 1 shows a longitudinal section in somewhat diagrammatic form of an apparatus embodying the essential features necessary for the practice of our invention. The apparatus of Figure 1 consists of a shell 13 lying between body members 14 and 15, and completed at either end by end pieces 16 and 17. Tube plate 18 is placed between members 14 and 16, and tube plate 19 is placed between members 15 and 17. Tubes 20 extend between tube sheets 18 and 19 and are securely fastened into the respective tube sheets by rolling, welding, or other form of fastening appropriate. Orifice plate 21 is placed between parts 13 and 14 and the tubes 20 pass through plate 21 without being affixed thereinto. Orifice plate 22, similarly, is placed between members 13 and 15, and tubes 20 similarly pass through orifice plate 22. The end member 17 is equipped with an inlet fitting 23 and end member 16 is equipped with an outlet fitting 24. Inlet member 25 communicates with the space inside of member 15 between plates 19 and 22, surrounding tubes 20. Outlet member 26 communicates with the space within member 14 between plates 18 and 21, and around tubes 20. Orifice plates 21 and 22 are equipped with orifices 27, distributed uniformly over that portion of their area not occupied by passages for tubes 20. Oil entering through inlet 25 will pass through the orifices 27 in plate 22, longitudinally through the space within the shell 13, through the orifices 27 in plate 21, and leave the system through fitting 26. A heat exchange fluid may enter through 23, pass through tubes 20 and leave the apparatus through fitting 24 without coming in physical contact with the oil. Tubes 20 being constructed of heat conductive material, the two fluids are in heat exchange relationship. The direction of flow of either fluid may be changed without altering this relationship. The shell 13 serves as the container for a catalytic or contact mass preferably composed of granular particles. This contact mass may be introduced and removed by making use of the openings normally covered by plates 28 and 29.

The design and arrangement of the tubes 20 within the shell 13 is such that these tubes 20 also serve to divide the catalyst bed maintained in shell 13 into a large number of longitudinal passages, whose greatest length is parallel to the direction of reaction mixture flow through the shell, and which are relatively thin in at least one dimension transverse thereto. To assist in this division, and also to augment the ratio between external surface and internal surface of the heat exchange tubes 20, fins 30 are placed upon the external surface of the heat exchange tubes. To properly subdivide the contact mass into suitable longitudinal passages, the tubes and fins preferably should be arranged so as to permit the least resistance to longitudinal flow and at the same time to furnish a maximum resistance to lateral flow, although it is preferred that no unit path or passage be completely isolated from contact with other passages for reasons stated above. The arrangement is preferably such as to give a substantially uniform cross-sectional area of catalyst throughout the length of each passage and of the catalyst case, which of itself promotes longitudinal flow under uniform conditions.

Figure 3:
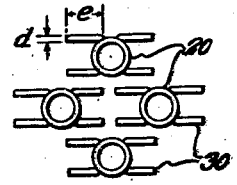
Figure 4:
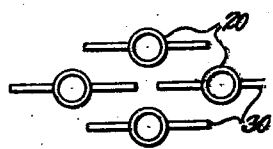
Figure 5:
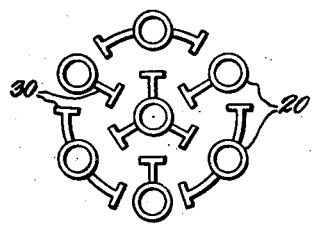

Figure 2 shows a cross-section of the catalyst-containing portion of the apparatus of Figure 1 and sets forth a convenient and economical arrangement of tubes and fins to accomplish these purposes, which arrangement is shown in more detail in Figure 3. Figures 4, 5 and 6 show other optional arrangements of finned tubes. In these figures the setup is designed for the circulation of heat exchange medium inside the tubes, the contact mass being outside.

It is also possible to preserve the longitudinal positioning of the passages within the catalyst mass while making use of heat exchange tubes positioned transversely thereto. In Figures 7 and 8 two views are shown of a design in which this is accomplished. This apparatus consists of a catalyst casing 31, mounted above a reaction mixture inlet housing 32, which is divided from the catalyst space by distributor plate 33 in which there are orifices 34. Above the catalyst chamber is reaction mixture exit housing 35. On two sides of the catalyst casing 31, auxiliary plates 36 and 37 define spaces 38 and 39, which act as inlet and outlet chambers for heat exchange medium which may enter by 40, and leave by 41, or the reverse, and which is conducted through the catalyst bed by a series of tubes 42 extending from side to side of the catalyst case. These tubes are arranged in vertical rows and are preferably equipped with fins 43, the tubes and fins being arranged so as to subdivide the catalyst mass into a number of longitudinally extending paths of relatively great length in proportion to cross-section, as shown. This object may also be approximated by using smaller vertical spacing of unfinned tubes, while maintaining the same horizontal spacing.

As stated above, certain factors or proportions in the design of the apparatus are important, Taking a typical example, where the catalyst mass is composed of granular particles of clay, which may themselves be the catalyst or in and/or on which an active catalytic material such as a metallic oxide is deposited, the following criteria may be used as typical of commercial design. The dimensions of the apparatus and tube spacing should be such that the unit reaction paths defined thereby should be 3 or more feet in length, or up to 15 feet or more, and having at least one cross-dimension relatively short, preferably not exceeding 1 to 2 inches. The several ratios stated elsewhere herein should be observed. The maximum distance of any catalyst particle from any heat extraction surface preferably should be about ½ inch, and not more than about 1 inch. The average distance of any catalyst particle from a heat extraction surface is preferably about ¼ inch, and not more than about ½ inch. When fins are used, to insure proper heat transmission, design should be such that Δ T(fin), the temperature drop from fin tip to fin base should not be greater than about 25%, and preferably about 10% of Δ T(total), the temperature drop from catalyst bed to heat exchange medium. Designed proportions of fins should be such that for any cross-section of the fin, "$l$," the length of the cross-section, divided by "$d$," the least transverse dimension of fin, (see Figure 3), should not be greater than about 12 and preferably about 4 to 8. That is, $$\frac{l}{d} = \text{not greater than } 12$$

$$\frac{l}{d} = \text{preferably } 4 \text{ to } 8$$

The optimum dimensions, ratios, etc. given herein are based particularly upon use of a cylindrical catalyst granule about 2½ mm. in diameter by about 4 mm. average length, or any other shape having a like mass and percentage of void per unit volume of packed catalyst. As the catalyst particle size increases, the ratio of heat extraction surface to unit catalyst volume may decrease and the maximum distance of catalyst particle from heat extraction surface may increase. The same changes may be made with a catalyst mass of greater heat conductivity than that indicated. When the design controlling operation is that of regeneration, a high degree of coking will call for increased heat extraction surface relative to catalyst volume ratio and decreased maximum distance, and conversely. It will be understood, therefore, that the optimum specific dimensions, ratios, etc. will vary somewhat according to the particular needs of a particular operation. No claim is made herein to any particular composition or physical form of catalyst or contact mass.

An important feature in apparatus shown by these figures is the restricted intercommunication of one series of conduits intermediate their ends. For any given zone layer along the flow paths through the contact mass, which zone may be considered as being relatively thin and at substantially uniform static pressure under normal conditions of flow, the free area for flow between conduits in a transverse direction is relatively small compared with the free area in a direction longitudinal to the flow of reaction material. Normal flow is largely longitudinal of the respective conduits but substantial flow between conduits to compensate for abnormal conditions is possible. Furthermore, the embodiment of these features in combination with preferred relationships defined herein constitutes an important feature of this invention.

To understand how uniform distribution of flow may be accomplished, reference is made to Figure 9 of the drawings, in which there is shown in diagrammatic form three passages, 44, 45 and 46, each packed with contact mass and between which there is restricted communication at intervals along their length by cross passages 47. In passage 44 there is a stoppage 48, indicated by denser packing of the contact mass. Equal amounts of reaction mixture, as indicated by the flow lines, are introduced at the bottom of the several paths. Only a portion of that normally flowing in path 44 can pass through the stoppage 48. As indicated by the flow lines, the remainder will pass through some horizontal intercommunication 47 below the stoppage, be distributed among the other paths and again through some other horizontal passage 47 above the stoppage it will return to passage 44, so that in this manner there is maintained throughout the case a substantially uniform distribution of flowing reaction material among the several paths and along their length by virtue of their restricted lateral intercommunication.

Figure 10 of the drawings shows a form of reaction case which not only admirably embodies the essential features of our invention, but which is perhaps more adaptable for the commercial practice of the invention than the form shown in Figure 1, in that it is able to successfully withstand the strains and distortions set up by differential expansion of the several parts of the apparatus upon heating and cooling. The apparatus shown in longitudinal section in Figure 10 is enabled to handle these stresses by means of an internal floating head arrangement. The apparatus of Figure 10 consists of a shell 49, to which are attached end sections 50 and 51. Reaction mixture is admitted to the shell space 49 by inlet fitting 52 and reaction products are withdrawn by outlet fitting 53 in end member 51. Between shell 49 and end member 50, there is placed a heavy tube sheet 54 in which are rolled tubes 55. These tubes 55 at their upper end are secured in the tube sheet member of floating head 56. A large central tube 57 is also secured between tube sheet 54 and the floating head 56. Heat exchange medium is introduced by inlet fitting 57', led to the space within end fitting 59, through tubes 55 into floating head 56, thence into central tube 57 and out through outlet 58. The tubes 55 are equipped with fins 59 as before. Catalyst is confined between support plate 60 and plate 61, both of which have orifices 62 for the passage of reaction mixture therethrough. To support plate 60 some distance above tube sheet 54 and thus provide a plenum chamber for the introduction of reaction material, there are used short lengths of pipe 63 surrounding tubes 55, resting on tube sheet 54 and supporting orifice plate 60. The fins 59 on tubes 55 extend between plates 60 and 61, and plate 61 conveniently may be supported upon the upper ends of these fins if it be so desired. This apparatus is arranged to be installed in vertical position and may be supported conveniently by the skirt 64 as shown. It is preferably arranged as shown for assembly by means of bolted flanges and may be charged with catalyst before placing end piece 51 in final position and discharged of catalyst, at the infrequent intervals necessary, by lifting shell 49 free from tube plate 54 until the catalyst may be removed from above plate 60. It is obvious that in this design the direction of passage of either reaction material or heat exchange medium may be reversed from that indicated while preserving the essential features of operation shown. It will be seen that in this design convenient provision for the handling of differential heat expansion and the like has been made and a design convenient and economical of fabrication has been attained. Figure 11 shows a horizontal cross-section of Figure 10, taken at a point between the ends of the catalyst-containing space.

It may be seen that these various forms of apparatus all embody one general characteristic. They permit the use of catalyst masses which are relatively of great length in the direction of reaction material flow and which have at least one dimension transverse thereto of relatively small magnitude, so that each portion of the catalyst therein is in effective heat exchange relationship with a positively circulated heat exchange medium by which its temperature may be controlled while in operation. Each design accomplishes this by arranging in one form or another, a series of conduits extending longitudinally of the direction of reaction material flow, which conduits are filled with a catalytic mass, and then surrounding and/or defining these with other conduits through which flows a heat exchange medium. Each design observes certain rules of proportion of parts which are set forth herein, and upon which the unique capability of the operation is in large part based. Provided that these rules of proportion of parts are followed, the method of operation set forth herein also may be followed in forms of construction wherein the catalyst mass is contained in tubular members properly spaced one from another, and surrounded by positively circulated heat transfer medium. Such construction is shown in Figure 12 and Figure 13.

In Figure 14, showing an operating setup for commercial practice of this invention, 71 is a heater for charge, 72 a vapor separator, 73 and 74 are catalyst cases, 75 is a fractionator for treatment of processed vapors, 76 a condenser, and 77 a gas separator. Charge stock enters the system through pump 78 and, by means of the manifold arrangement shown, any portion of it may be passed through heat exchangers 79 and 80 in any sequence desired, to be later collected in pipe 81 and passed through furnace heater 71 and into vapor separator 72, where a vaporous charge for the catalytic process, substantially free from liquid and materials of unduly high boiling point is prepared. In case the charge stock selected is wholly vaporous at the desired reaction temperatures, the vapor separator may be dispensed with. Any liquid separated in 72 may be removed from the system by pipe 82. Vapors from 72 pass through pipe 83, and if catalyst case 73 be "on stream" through pipe 84 into case 73, the valve in pipe 85 being closed. Passing through catalyst case 73, the treated reaction mixture leaves through pipe 86, pipe 87 being closed, and through pipe 88 to fractionator 75. Material heavier than desired product is condensed in 75 and withdrawn through pipe 89 to storage, or it may be recycled in company with charge, or it may be retreated in another step of catalytic or thermal conversion. Product vapors leaving 75 through pipe 90 are condensed in 76, and separated from uncondensible gas in 77. While catalyst case 73 is "on stream," catalyst case 74 will be regenerating. Regeneration medium (in this operation air is used), is supplied by compressor 91, and passed through pipe 92 into case 74. Regeneration gases, leaving case 74 by pipe 93, may pass either through cooler 94 or through cooler 80 and after recovery of heat therefrom, are discharged to the atmosphere. Cooler 94 may be water cooled, or may be a waste heat boiler, or may heat charge for other processes, and any suitable division of flow through these two cooling means may be used. Heat transfer medium is supplied under pressure by pump 95 to discharge manifold 96, from which any desired disposal may be made to the tubes in cases 73 and 74, the heated medium, recollected in manifold 97 being passed through cooler 79 before return to the pump.

In the usual case, in the setup shown, the heat transfer medium is cooled to a temperature somewhat above the reaction temperature in case 73, and a sufficient volume is passed through case 73 to supply endothermic reaction heat and at the same time insure even distribution of reaction therein. Another portion is passed through case 74, sufficient in amount to control distribution of the regeneration reaction therein, to remove excess reaction heat therefrom, and to supply kindling heat to the incoming regeneration air. The heat transfer medium may be any suitable fluid, but is preferably a liquid such as a molten metal, a molten alloy, or fused inorganic salts, or other liquid possessed of low vapor pressure, of high heat absorbing capacity per unit volume per degree temperature change, and reasonably low viscosity at the temperature, (200° F. to 1100° F.) at which it is used. Preference is given to materials of low vapor pressure melting below 350° F., so that the medium may be removed from shutdown apparatus by steam heating. Convenient materials are mixtures of aluminum chloride and sodium chloride; of zinc chloride, potassium chloride and sodium chloride; or a mixture consisting essentially of a mixture of sodium and potassium salts of nitrogen acids.

At the end of regeneration, air from pipe 92 is shut off, steam is admitted to case 74 through connection 98, and regeneration medium and products are steamed out through regeneration gas disposal means. When case 73 comes "off stream" it is steamed out to the vapor system by steam admitted through connection 99. Then case 74 is put "on stream" and case 73 is regenerated.

As stated above, various relationships and ratios involving such matters as amount of heat transferring surface, volume of heat exchange medium and volume of contact mass are important features of the invention, and have been reasonably well determined by actual operation and experimentation. The following figures represent a preferred relationship which has been found to operate satisfactorily. It will be understood that the figures given refer only to that portion of the apparatus which contains the contact mass and do not include the adjacent zones where tube headers, heat exchange medium manifolds or distribution spaces, and vapor passages exist but which do not contain contact mass.

This is also true of the figures stated in the claims.

| | |
|---|---|
| Volume of catalyst including voids | 71.4 |
| Volume of heat exchange metal (tubes and fins) | 19.6 |
| Volume occupied by molten salt in tubes | 9.0 |
| Total (volume of space occupied by catalyst, salt, and heat exchange surfaces) | 100.0 |
| Heat exchange surface per cubic inch of molten salt | 19.7 square inches |
| Heat exchange surface per cubic inch of metal in heat transfer tubes and fins | 9.0 square inches |
| Heat exchange surface per cubic inch of molten salt plus metal | 6.2 square inches |
| Heat exchange surface per cubic inch of catalyst | 2.5 square inches |

We give the following data to define the preferred range for best design and operation:

| | |
|---|---|
| Volume of catalyst including voids | 60-80% of space in catalyst zone |
| Volume of molten salt | 2-15% of space in catalyst zone |
| Volume of metal (tubes and fins) | 15-30% of space in catalyst zone |
| Volume of catalyst plus salt plus metal | 100.00% of space in catalyst zone |
| Heat exchange surface per cubic inch of molten salt | 15-60 square inches |
| Heat exchange surface per cubic inch of metal in heat transfer tubes and fins | 5-15 square inches |
| Heat exchange surface per cubic inch of molten salt plus metal | 4-12 square inches |
| Heat exchange surface per cubic inch of catalyst | 1.5-6 square inches |

It will be understood that, while best design and operation in accordance with this invention is obtained by observing the limits and ranges set forth above, a gradual approach to such limits and ranges will naturally begin to produce some of the advantages obtained by the present invention. There is, therefore, a borderline range of relationships which do not yield the results obtainable by practice of the preferred form of the invention but within which some of the advantages of the invention begin to be realized. For the purpose of defining this borderline range we give below figures defining relationships beyond the limits of which operating difficulties would arise which would seriously impair the efficiency of the process or would increase the cost to a most undesirable level as compared with our preferred design and operation.

| | |
|---|---|
| Volume of catalyst including voids | 40-90% of space in catalyst zone |
| Volume of molten salt | 1-25% of space in catalyst zone |
| Volume of metal (tubes and fins) | 5-50% of space in catalyst zone |
| Heat exchange surface per cubic inch of molten salt | 5-100 square inches |
| Heat exchange surface per cubic inch of metal in heat transfer tubes and fins | 3-30 square inches |
| Heat exchange surface per cubic inch of molten salt plus metal | 2-20 square inches |
| Heat exchange surface per cubic inch of catalyst | 0.5-8 square inches |

These relationships and ratios, as herein set forth, define the relationship between the hydraulic radius of the catalyst path, the mass velocity of the critical reactant and the mass velocity of the heat exchange medium. The term "hydraulic radius" as used here is the factor defined in Perry—"Chemical Engineers Hand Book" (McGraw Hill Book Company) (1934) at page 722. The design is controlled by the ratio of heat transferred to heat liberated or absorbed in the catalyst. The heat liberated during regeneration is substantially the greatest quantity. Under proper conditions, as herein set forth, this heat liberation may be made substantially uniform per unit volume of catalyst. Similarly, heat transfer may be made uniform per unit area of heat transfer surface. The proper proportion of catalyst volume to surface defining that volume is then shown by $$\frac{\text{Heat liberated per unit time per unit volume}}{\text{Heat transferred per unit time per unit area}} = HR$$

wherein HR is a quantity of the nature of a hydraulic radius, having the dimension of length, and as shown herebefore has a broad range of from 1/8" to 2" and a preferred range of from 1/8" to 2/3". The rate of heat liberation per unit volume of catalyst is a function of the mass velocity of air (regeneration medium) in weight per unit volume of catalyst per unit of time, in proportion to coke to be burned from said catalyst, which may be applied without excessive rise in temperature sufficient to damage the catalyst. This may be expressed as a burning rate, which, while not exceeding about 1,000° F. under conditions of operation, will remove coke at the rate of from about 1% by weight of catalyst to about 10% per hour for a broad range of possible operation, and from about 3% to about 6% for preferred operation. The mass velocity of heat transfer medium of course depends upon the specific heat and other characteristics of the medium. It is best defined as that mass velocity of heat exchange medium which will extract the required amount of heat while undergoing a temperature rise of not greater than about 50° F. and preferably of from 2° to 10° F.

Some of the advantages of the method of this invention are high throughput rates per unit volume of catalyst, high conversion rates at acceptable throughputs, low coke from side and subsequent reactions, low gas from like reactions, uniformity of reaction throughout the catalyst bed, uniformity of kind of product produced from all portions of the bed, uniformity of deposit of coke and reaction products throughout the bed, and other advantages, all of which also result result indirectly in higher unit yields. As an important contribution to the flexibility and ease of control of the process, temperature of the entire body of heat transfer medium is capable of such rapid adjustment, that difficulties due to variation in temperature level of incoming reaction mixture are practically wiped out. This is of especial time saving importance in changing over from one reaction to another, as for example, taking a case off stream in a polymerization operation at about 300° F. and putting it into regeneration at about 850° F. Separate exchangers for heating or cooling may be installed between pump 95 and the respective cases 73 and 74 if desired.

The regeneration step also benefits greatly by the invention herein disclosed. The regeneration reaction is substantially uniform throughout the mass, both because the distribution of regeneration gases is uniform, and because the reaction having been substantially uniform, the density of reaction deposits is also substantially uniform. The regeneration is far more rapid with equal delicacy of temperature control and completeness of regeneration. The control of regeneration temperatures is easy, accurate, and positive, thus further promoting uniformity. Regeneration can be effected with atmospheric temperature air, eliminating expensive preheater installations formerly thought to be necessary. The regeneration heat is rejected from the system at higher temperature levels. The heat transfer medium offers an effective means whereby some of this regeneration heat may be supplied to the cracking reaction for latent heat uses.

An important feature is the ability to purge in this process, between case changes, by the simple use of steam. Some catalytic methods, because of their inherent tendency to by-pass and channel, cannot be steam purged effectively without extremely long and uneconomical steaming. It has been found that when using the reaction method herein disclosed, the catalyst cases may be purged easily and completely by the simple application of steam under some pressure.

With the high charging rates possible with this invention greatly increased yields per unit of time, per unit of catalyst volume and per dollar of apparatus cost are possible. High percentage of yield on the charge can be obtained by recycling or otherwise repassing portions of the charge through the catalyst, still effecting great savings in time and cost.

These advantages flow from the use of the method of conversion and the method of regeneration disclosed herein, used together as complementary parts of a unitary process of oil conversion.

The catalytic reaction is preferably conducted under a gauge pressure not substantially in excess of 30 to 40 pounds per square inch. Rates of coke deposition per unit yield increase rapidly with increases in pressure, and the preferred operation is at pressures ranging from atmospheric upwards to about 20 pounds per square inch gauge. Under these conditions, it is necessary to recompress fixed gases yielded by the process in order to introduce them to the customary vapor recovery operations, but this cost is more than regained by lower cost of regeneration. With stocks tending to form very little coke, pressure may be raised to the range 30 to 40 pounds gauge and recompression of gases avoided without sacrifice of good regeneration conditions.

The catalytic reaction for conversion of other oils to gasoline may be conducted at temperatures in the catalyst mass between about 810° F. and about 950° F. and preferably between 875° F. and 900° F. The rate of charge for such conversion will usually be in excess of twenty liters of liquid charge per hour per twenty liters of catalyst mass, and should preferably be at least fifty liters liquid charge per hour per twenty liters of catalyst. Such rates of charge and temperatures, using a charge which is clean, i. e., substantially free of unvaporized particles of high boiling oils and the like, prone to heavy coke formation, should result in a coke deposit amounting to from about 0.1% to about 2.0% by weight of the catalyst, (average condition throughout the case), and under the preferable ranges of operation, from 0.2% to 1.5% by weight of catalyst.

The regeneration operation should be conducted by the introduction of air at atmospheric temperature and under pressures very slightly above atmospheric, sufficient only to insure flow through the apparatus at the requisite rates. The temperature of regeneration should range from about 825° F. to about 1,000° F. Preferred operation is at about 900° F. and with a clay type catalyst, 1,000° F. should not be exceeded due to possibility of rapid catalyst deterioration above those temperatures. The rate of air introduction should be such that the proper temperatures are maintained while burning off coke at a rate of from about 1% by weight of catalyst to about 10% per hour, the preferred burn-off rate being from 3 to 6% per hour. Under these conditions the carbon dioxide in the resulting fume will range from about 3% to about 12%, the preferred range being from 6% to 11%.

It is understood that the exemplary and numerical data herein given are set forth largely for the purposes of illustration and that the invention is not limited thereby except as such limitations are expressed in the claims.

What is claimed is:

1. A process for effecting the conversion of hydrocarbons into hydrocarbons of the gasoline type, comprising passing the hydrocarbons to be converted, in a vaporized state, in a plurality of paths through a body of contact material, while maintaining all portions of the contact material and contacting vapor at substantially uniform temperature within a range where substantial conversion of the hydrocarbons will take place with resultant deposition of a contaminating combustible substance upon the contact material, continuing such passage of hydrocarbons and the conversion thereof until the deposit upon the contact material renders it inefficient and regeneration is desirable, removing vapor products from contact with the contact material, passing combustion supporting gas through the used contact material to effect regeneration thereof in situ by flowing said gas through the body of contact material in the form of streams, the effective heat exchange peripheries of which are greater than the minimum periphery required to encircle their cross-sectional area, said streams each being sufficiently thin in at least one dimension to maintain the temperature difference between portions of said contact material across transverse sections thereof within a range not exceeding the difference between the minimum temperature at which the burning of contaminating combustible material occurs and a maximum temperature above which substantial damage to the contact material occurs and being of a length several times its narrowest cross-sectional dimension, each of said streams being in restricted communication throughout substantially the entire length thereof with at least one stream adjacent thereto, and continuously removing heat from the burning areas by the use of a heat control medium circulated through the contact material in conduits, and in sufficiently intimate relation to the contact material to maintain all portions of the contact material within the operative temperature range.

2. A process for effecting the conversion of hydrocarbons into hydrocarbons of the gasoline type which comprises passing the original hydrocarbons in a vaporized state in a plurality of paths through a body of contact material while maintaining all portions of the contact material and contacting vapor at a substantially uniform temperature within a range where substantial conversion of the hydrocarbons will take place, continuing such passage of hydrocarbons and the conversion thereof until the contact material becomes inefficient and regeneration is desirable, removing vapor products from contact with the contact material, passing combustion supporting gas through the body of used contact material to effect regeneration thereof in situ by flowing said gas through the contact material in the form of streams defined to a substantial extent by heat exchange surfaces, said streams each being sufficiently thin in at least one dimension to maintain the temperature difference between portions of contact material across transverse sections thereof within a range not exceeding the difference between a minimum temperature at which the burning of contaminating combustible material occurs and a maximum temperature above which substantial damage to the contact material occurs and being of a length several times its narrowest cross-sectional dimension, each of said streams being in restricted communication throughout substantially the entire length thereof with at least one stream adjacent thereto, and continuously removing heat from the burning areas by the use of a heat control medium in sufficiently intimate indirect heat exchange relationship to the contact material through said heat exchange surfaces to maintain all portions of the contact material within the operative temperature range.

3. A process for effecting the conversion of hydrocarbons into hydrocarbons of the gasoline type which comprises passing the original hydrocarbons in vapor phase in a plurality of paths through a body of contact material while maintaining all portions of the contact material and contacting vapor at a substantially uniform temperature within a range where substantial conversion of the hydrocarbons will take place, continuing such passage of hydrocarbons and the conversion thereof until the contact material becomes inefficient and regeneration is desirable, removing vapor products from contact with the contact material, passing combustion supporting gas through the used contact material to effect regeneration thereof in situ by flowing said gas through the body of contact material in the form of streams defined to a substantial extent by heat exchange surfaces, said streams each being sufficiently thin in at least one dimension to maintain the temperature difference between portions of contact material across transverse sections thereof within a range not exceeding the difference between a minimum temperature at which the burning of the contaminating combustible material occurs and a maximum temperature above which substantial damage to the contact material occurs and being of a length several times its narrowest cross-sectional dimension, each of said streams being in restricted communication throughout substantially the entire length thereof with at least one stream adjacent thereto, and continuously removing heat from the burning areas by the use of a heat control medium in sufficiently intimate indirect heat exchange relationship to the contact material through said heat exchange surfaces to maintain all portions of the contact material within the operative temperature range, the heat control medium being maintained at a temperature substantially approaching the lower limit of the temperature range within which regeneration will occur.

4. In a process for making gasoline involving converting hydrocarbons into other desired hydrocarbons within the gasoline range by contacting the original hydrocarbons in vapor phase with a body of contact material that effects such conversion, accompanied by the deposition of a nonvolatile combustible substance upon said contact material, and then burning the combustible deposit off of said contact material, the steps of passing the hydrocarbons through the body of contact material in a plurality of elongated paths of at least about three feet, to effect the desired amount of conversion, continuing such flow of hydrocarbons until the deposit upon the contact material is such as to render regeneration thereof desirable, and thereafter regenerating the contaminated contact material in situ in said elongated paths by passing the combustion supporting gas into the used contact material throughout all portions thereof to effect burning of said deposit throughout all parts of the contact material, flowing said gas through said body of contact material as aforesaid in the form of thin streams defined to a substantial extent by heat exchange surfaces sufficiently thin in at least one dimension to maintain the temperature difference between portions of the contact material across transverse sections of said respective thin streams within a range not exceeding the difference between the minimum temperature at which effective burning of said deposited combustible substance occurs and the maximum temperature above which substantial damage to the contact material occurs, each of said streams being in restricted communication throughout substantially the entire length thereof with at least one stream adjacent thereto, continuously removing heat from burning areas within the contact material by abstracting said heat throughout a substantial proportion of the respective outer surfaces of said thin streams transversing said areas through said heat exchange surfaces to a heat control medium, withdrawing said heat at a temperature level sufficiently high to permit continuance of the desired burning but sufficiently low so that the maximum temperature of the aforesaid limited temperature range throughout the entire length of each of said elongated thin streams will not exceed the temperature above which substantial damage to the contact material occurs, and continuing burning as aforesaid until the contact material has been adequately freed of the combustible deposit.

5. In a process for making gasoline involving converting hydrocarbons into other lower boiling point hydrocarbons by contacting the original hydrocarbons in a vaporized state with a body of contact material that effects such conversion, accompanied by the deposition of a non-volatile combustible substance upon said contact material, and then burning the combustible deposit off of said contact material, the steps of passing the hydrocarbons through the body of contact material in a plurality of elongated paths to effect the desired amount of conversion, continuing such flow of hydrocarbons until the deposit upon the contact material is such as to render regeneration thereof desirable, and thereafter regenerating the contaminated contact material in situ in said elongated paths by passing combustion supporting gas into the used contact material throughout all portions thereof to effect burning of said deposit throughout all parts of the contact material, flowing said gas through said body of contact material as aforesaid in the form of streams defined to a substantial extent by heat exchange surfaces, each of said streams being sufficiently thin in at least one dimension to maintain the temperature difference between portions of the contact material across transverse sections of said respective thin streams within a range not exceeding the minimum temperature at which effective burning of said deposited combustible substance occurs and the maximum temperature above which damage to the contact material occurs and of a length several times its narrowest cross-sectional dimension, each of said streams being in restricted communication throughout substantially the entire length thereof with at least one stream adjacent thereto, continuously removing heat from burning areas within the contact material by abstracting said heat throughout a substantial proportion of the respective outer surfaces of said thin streams transversing said areas through said heat exchange surfaces, withdrawing said heat at a temperature level sufficiently high to permit continuance of the desired burning but sufficiently low so that the maximum temperature of the aforesaid limited temperature range throughout the entire length of each of said elongated thin streams will not exceed the temperature above which substantial damage to the contact material occurs, and continuing burning as aforesaid until the contact material has been adequately freed of the combustible deposit.

6. In a process for making gasoline involving converting hydrocarbons into other desired hydrocarbons within the gasoline range by contacting the original hydrocarbons in vapor phase with a body of contact material that effects such conversion, accompanied by the deposition of a nonvolatile combustible substance upon said contact material, and then burning the combustible deposit off of said contact material, the step of regenerating the contaminated contact material in situ by passing combustion supporting gas into the used contact material throughout all portions thereof to effect burning of said deposit throughout all parts of the contact material, flowing said gas through said body of contact material as aforesaid in the form of streams defined to a substantial extent by heat exchange surfaces, each of said streams being sufficiently thin in at least one dimension to maintain the temperature differences between portions of the contact material across transverse sections of said respective thin streams within a range not exceeding the minimum temperature at which effective burning of said deposited combustible substance occurs and the maximum temperature above which substantial damage to the contact material occurs and being of a length several times its narrowest cross-sectional dimension, each of said streams being in restricted communication throughout substantially the entire length thereof with at least one stream adjacent thereto, continuously removing heat from burning areas within the contact material by abstracting said heat in a direction substantially parallel to the minimum transverse dimension of the respective thin streams and throughout a substantial proportion of the respective outer surfaces of said thin streams as they transverse said areas through said heat exchange surfaces, withdrawing said heat at a temperature level sufficiently high to permit continuance of the desired burning but sufficiently low so that the maximum temperature of the aforesaid limited temperature range throughout the entire length of each of said thin streams will not exceed the temperature above which substantial damage to the contact material occurs, and continuing burning as aforesaid until the entire contact material has been adequately freed of the combustible deposit.

7. In a process for making gasoline involving converting hydrocarbons into other desired hydrocarbons within the gasoline range by contacting the original hydrocarbons in vapor phase with a body of contact material that effects such conversion, accompanied by the deposition of a nonvolatile combustible substance upon said contact material, and then burning the combustible deposit off of said contact material in situ, the steps of passing combustion supporting gas into the used contact material throughout all portions thereof to effect burning of said deposit throughout all parts of the contact material, flowing said gas through said body of contact material as aforesaid in the form of streams defined to a substantial extent by heat exchange surfaces, each of said streams being sufficiently thin in at least one dimension to maintain the temperature difference between portions of the contact material across transverse sections of said respective thin streams within a range not exceeding the minimum temperature at which effective burning of said deposited combustible substance occurs and the maximum temperature above which substantial damage to the contact material occurs, each of said streams being in restricted communication throughout substantially the entire length thereof with at least one stream adjacent thereto, continuously removing heat from burning areas within the contact material by the use of a heat control medium maintained at a temperature substantially approaching the lower limit of the temperature range within which burning occurs, abstracting said heat throughout a substantial proportion of the respective outer surfaces of said thin streams transversing said areas through said heat exchange surfaces, and continuing burning as aforesaid until the contact material has been adequately freed of the combustible deposit, thereafter passing hydrocarbon vapors into said body of contact material throughout all portions thereof to effect conversion of said hydrocarbons in all parts of the contact material, flowing said hydrocarbon vapors through said contact material as aforesaid in the form of thin streams sufficiently thin in at least one dimension to maintain the temperature difference between portions of said thin streams within a range not exceeding that which is permissible in effecting the desired conversion.

8. In a process for making gasoline involving converting hydrocarbons into other hydrocarbons of a lower boiling point by contacting the original hydrocarbons in a vaporized state with a body of contact material that effects such conversion, accompanied by the deposition of a non-volatile combustible substance upon said contact material, and then burning the combustible deposit off of said contact material in situ, the steps of passing combustion supporting gas into the used contact material throughout all portions thereof to effect burning of said deposit, throughout all parts of the contact material, flowing said gas through said body of contact material as aforesaid in a plurality of elongated paths of a length of at least about three feet in the form of streams defined to a substantial extent by heat exchange surfaces, each of said streams being sufficiently thin in at least one dimension to maintain the temperature difference between portions of the contact material across transverse sections of said respective thin streams within a range not exceeding the minimum temperature at which effective burning of said deposited combustible substance occurs and the maximum temperature above which substantial damage to the contact material occurs, and being of a length several times the narrowest cross-sectional dimension, each of said streams being in restricted communication throughout substantially the entire length thereof with at least one stream adjacent thereto, continuously removing heat from burning areas within the contact material by abstracting said heat throughout a substantial proportion of the respective outer surfaces of said thin streams transversing said areas through said heat exchange surfaces to a heat control medium maintained in indirect heat exchange relationship with said contact material, withdrawing said heat at a temperature level sufficiently high to permit continuance of the desired burning but sufficiently low so that the maximum temperature of the aforesaid limited temperature range throughout the entire length of each of said elongated thin streams will not exceed the temperature above which substantial damage to the contact material occurs, and continuing burning as aforesaid until the contact material has been adequately freed of the combustible deposit, thereafter passing hydrocarbon vapors into said contact material throughout all portions thereof to effect conversion of said hydrocarbons, in all parts of the contact material, flowing said hydrocarbon vapors through said contact material as aforesaid in a plurality of elongated paths of a length of at least about three feet in the form of streams each sufficiently thin in at least one dimension to maintain the temperature difference between portions of the contact material within a range not exceeding that which is permissible in effecting the desired conversion.

9. A process for effecting the conversion of hydrocarbons into hydrocarbons of the gasoline type, comprising passing the hydrocarbons to be converted, in vapor phase, in a plurality of paths through a body of contact material while maintaining all portions of the contact material and contacting vapor within a temperature range where substantial conversion of the hydrocarbons will take place with resultant deposition of a contaminating combustible substance upon the contact material, continuing such passage of hydrocarbons and the conversion thereof until the deposit upon the contact material renders it inefficient and regeneration is desirable, removing vapor products from contact with the contact material, passing combustion supporting gas through the used contact material to effect regeneration thereof in situ by flowing said gas through the body of contact material in the form of thin streams sufficiently thin in at least one dimension to maintain the temperature difference between portions of said contact material across transverse sections of respective thin streams within a range not exceeding the difference between a minimum temperature at which the burning of the contaminating deposit occurs and a maximum temperature above which substantial damage to the contact material occurs and being of a length several times their narrowest cross-sectional dimension, each of said streams being in restricted communication throughout substantially the entire length thereof with at least one stream adjacent thereto, and continuously removing heat from the burning areas within the contact material to maintain the temperature thereof below that at which substantial damage occurs, by maintaining a heat control medium in indirect heat exchange relationship with said contact material.

10. A process for effecting the conversion of hydrocarbons into hydrocarbons of the gasoline type, comprising passing the hydrocarbon to be converted, in vapor phase, in a plurality of paths through contact material, while maintaining all portions of the contact material and contacting vapor within a temperature range where substantial conversion of the hydrocarbon will take place with resultant deposition of a contaminating combustible substance upon the contact material, continuing such passage of hydrocarbons and the conversion thereof until the deposit upon the contact material renders it inefficient and regeneration is desirable, removing vapor products from contact with the contact material, passing combustion supporting gas through the used contact material to effect regeneration thereof in situ by flowing said gas through the contact material in the form of thin streams defined at least to a major extent by heat exchange surfaces, said streams being sufficiently thin in at least one dimension to maintain the temperature difference between portions of said contact material across transverse sections of respective thin streams within a range not exceeding the difference between a minimum temperature at which the burning of the contaminating deposit occurs and a maximum temperature above which substantial damage to the contact material occurs, each of said streams being in restricted communication throughout substantially the entire length thereof with at least one stream adjacent thereto, and continuously removing heat from the burning areas within the contact material to maintain the temperature thereof below that at which substantial damage occurs, by flowing a heat control medium in heat transfer relationship with said heat exchange surfaces, whereby it is in indirect heat exchange relationship with said contact material, said heat control medium being maintained in the liquid phase at a temperature substantially between the minimum temperature of conversion and the maximum temperature of regeneration.

11. A process for effecting the conversion of initial fluid hydrocarbons into fluid hydrocarbon products, comprising passing the hydrocarbon to be converted, in a fluid state, in a plurality of paths through contact material, while maintaining all portions of the contact material and contacting fluid within a temperature range where substantial conversion of the hydrocarbon will take place with resultant deposition of a contaminating combustible substance upon the contact material, continuing such passage of hydrocarbons and the conversion thereof until the deposit upon the contact material renders it inefficient and regeneration is desirable, removing fluid hydrocarbons from contact with the contact material, passing combustion supporting gas through the used contact material to effect regeneration thereof in situ by flowing said gas through the contact material in the form of thin streams defined at least to a major extent by heat exchange surfaces, said streams being sufficiently thin in at least one dimension to maintain the temperature difference between portions of said contact material across transverse sections of respective thin streams within a range not exceeding the difference between a minimum temperature at which the burning of the contaminating deposit occurs and a maximum temperature above which substantial damage to the contact material occurs, each of said streams being in restricted communication throughout substantially the entire length thereof with at least one stream adjacent thereto, and continuously removing heat from the burning areas within the contact material to maintain the temperature thereof below that at which substantial damage occurs, by flowing a heat control medium in heat transfer relationship with said heat exchange surfaces, whereby it is in indirect heat exchange relationship with said contact material, said heat control medium being maintained in the liquid phase at a temperature substantially between the minimum temperature of conversion and the maximum temperature of regeneration.

12. In a process of converting initial fluid hydrocarbons into fluid hydrocarbon products by passing said initial fluid hydrocarbons through contact material in a plurality of catalyst paths, continuing such passage of hydrocarbons until deposition of a combustible contaminating deposit on said material renders the same inefficient, and regenerating the contaminated contact material by passing a combustion supporting gas therethrough; the improvement which comprises passing said gas through said contact material in the form of a plurality of streams defined to a major extent by heat exchange surfaces, each of said streams being in restricted intercommunication with at least one other of said streams adjacent thereto.

13. In a process of converting initial fluid hydrocarbons into fluid hydrocarbon products by passing said initial fluid hydrocarbons through contact material in a plurality of catalyst paths, continuing such passage of hydrocarbons until deposition of a combustible contaminating deposit on said material renders the same inefficient, and regenerating the contaminated contact material by passing a combustion supporting gas therethrough; the improvement which comprises passing said gas through said contact material in the form of a plurality of streams defined at least to a major extent by heat exchange surfaces and abstracting heat from said contact material through said heat exchange surfaces, each of said streams being in restricted intercommunication with at least one other of said streams adjacent thereto.

14. In a process of converting initial fluid hydrocarbons into fluid hydrocarbon products by passing said initial fluid hydrocarbons through contact material in a plurality of catalyst paths, continuing such passage of hydrocarbons until deposition of a combustible contaminating deposit on said material renders the same inefficient, and regenerating the contaminated contact material by passing a combustion supporting gas therethrough; the improvement which comprises passing said gas through said contact material in the form of a plurality of streams defined to a major extent by heat exchange surfaces, each of said streams being in restricted intercommunication with at least one other of said streams adjacent thereto throughout substantially the full extent of a dimension parallel to the direction of flow of said gas in said stream.

15. In a process of converting initial fluid hydrocarbons into fluid hydrocarbon products by passing said initial fluid hydrocarbons through contact material in a plurality of catalyst paths, continuing such passage of hydrocarbons until deposition of a combustible contaminating deposit on said material renders the same inefficient, and regenerating the contaminated contact material by passing a combustion supporting gas therethrough; the improvement which comprises passing said gas through said contact material in the form of a plurality of streams defined to a major extent by heat exchange surfaces, each of said streams being in restricted intercommunication with at least one other of said streams adjacent thereto throughout substantially the full extent of a dimension at right angles to the direction of flow of gas in said streams.

16. In a process of converting initial fluid hydrocarbons into fluid hydrocarbon products by passing said initial fluid hydrocarbons through contact material in a plurality of catalyst paths, continuing such passage of hydrocarbons until deposition of a combustible contaminating deposit on said material renders the same inefficient, and regenerating the contaminated contact material by passing a combustion supporting gas therethrough; the improvement which comprises passing said gas through said contact material in the form of a plurality of streams defined to a major extent by heat exchange surfaces, each of said streams being in restricted intercommunication with at least one other of said streams adjacent thereto throughout substantially the full extent of a dimension parallel to the direction of flow of said gas in said stream, and abstracting heat from said contact material through said heat exchange surfaces.

17. In a process of converting initial fluid hydrocarbons into fluid hydrocarbon products by passing said initial fluid hydrocarbons through contact material in a plurality of catalyst paths, continuing such passage of hydrocarbons until deposition of a combustible contaminating deposit on said material renders the same inefficient, and regenerating the contaminated contact material by passing a combustion supporting gas therethrough; the improvement which comprises passing said gas through said contact material in the form of a plurality of streams defined to a major extent by heat exchange surfaces, each of said streams being in restricted intercommunication with at least one other of said streams adjacent thereto throughout substantially the full extent of a dimension at right angles to the direction of flow of gas in said streams, and abstracting heat from said contact material through said heat exchange surfaces.

18. In a process of converting initial fluid hydrocarbons into fluid hydrocarbon products by passing said initial fluid hydrocarbons through contact material in a plurality of catalyst paths, continuing such passage of hydrocarbons until deposition of a combustible contaminating deposit on said material renders same inefficient, and regenerating the contaminated contact material by passing a combustion supporting gas therethrough; the improvement which comprises passing said fluid hydrocarbon through said contact material in the form of a plurality of streams defined to a major extent by heat conductive surfaces, each of said streams being in restricted intercommunication with at least one other of said streams adjacent thereto.

THOMAS P. SIMPSON.
JOHN W. PAYNE.
JOHN A. CROWLEY, Jr.
CLARK S. TEITSWORTH.